US012706936B2

(12) United States Patent
Phadke et al.

(10) Patent No.: US 12,706,936 B2

(45) Date of Patent: Aug. 11, 2026

(54) ARTIFICIAL BOT DETECTION FOR CONFERENCING APPS

(71) Applicant: Palo Alto Networks, Inc., Santa Clara, CA (US)

(72) Inventors: Anurag Mukund Phadke, Sunnyvale, CA (US); Francesco Vigo, Milan (IT); Paul Minh Pho Nguyen, Lathrop, CA (US); Sreejith Rajkumar, Danville, CA (US); Samuel Chehab, San Jose, CA (US); Ratnesh Saxena, San Francisco, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/777,271

(22) Filed: Jul. 18, 2024

(65) Prior Publication Data

US 2026/0025395 A1 Jan. 22, 2026

(51) Int. Cl.

*H04L 9/40* (2022.01)
*H04L 12/18* (2006.01)
*H04L 65/403* (2022.01)

(52) U.S. Cl.

CPC ...... *H04L 63/1425* (2013.01); *H04L 12/1822* (2013.01); *H04L 63/1441* (2013.01); *H04L 65/403* (2013.01)

(58) Field of Classification Search

None

See application file for complete search history.

(56) References Cited

U.S. PATENT DOCUMENTS

| | | | | |
|---|---|---|---|---|
| 12,238,391 | B1 * | 2/2025 | Akhoury | H04N 21/44236 |
| 2002/0147777 | A1 * | 10/2002 | Hackbarth | H04M 3/42374<br>709/227 |
| 2011/0281569 | A1 * | 11/2011 | Cohen | H04W 4/14<br>455/416 |
| 2014/0122657 | A1 * | 5/2014 | Crawley | H04N 7/152<br>709/219 |
| 2019/0147367 | A1 * | 5/2019 | Bellamy | G06N 3/006<br>706/12 |
| 2023/0273720 | A1 * | 8/2023 | Silverstein | H04L 65/4015<br>715/753 |
| 2025/0274651 | A1 * | 8/2025 | Su | H04L 12/1831 |
| 2025/0310477 | A1 * | 10/2025 | Dasher | H04N 7/152 |

* cited by examiner

*Primary Examiner* — Raqiul A Choudhury

(74) *Attorney, Agent, or Firm* — Van Pelt, Yi & James LLP

(57) ABSTRACT

One or more attendees joining a web conference are monitored. It is determined that one or more of the one or more attendees is an undesired attendee. In response to the determination, an action is caused to be performed.

19 Claims, 6 Drawing Sheets

Figure 5:
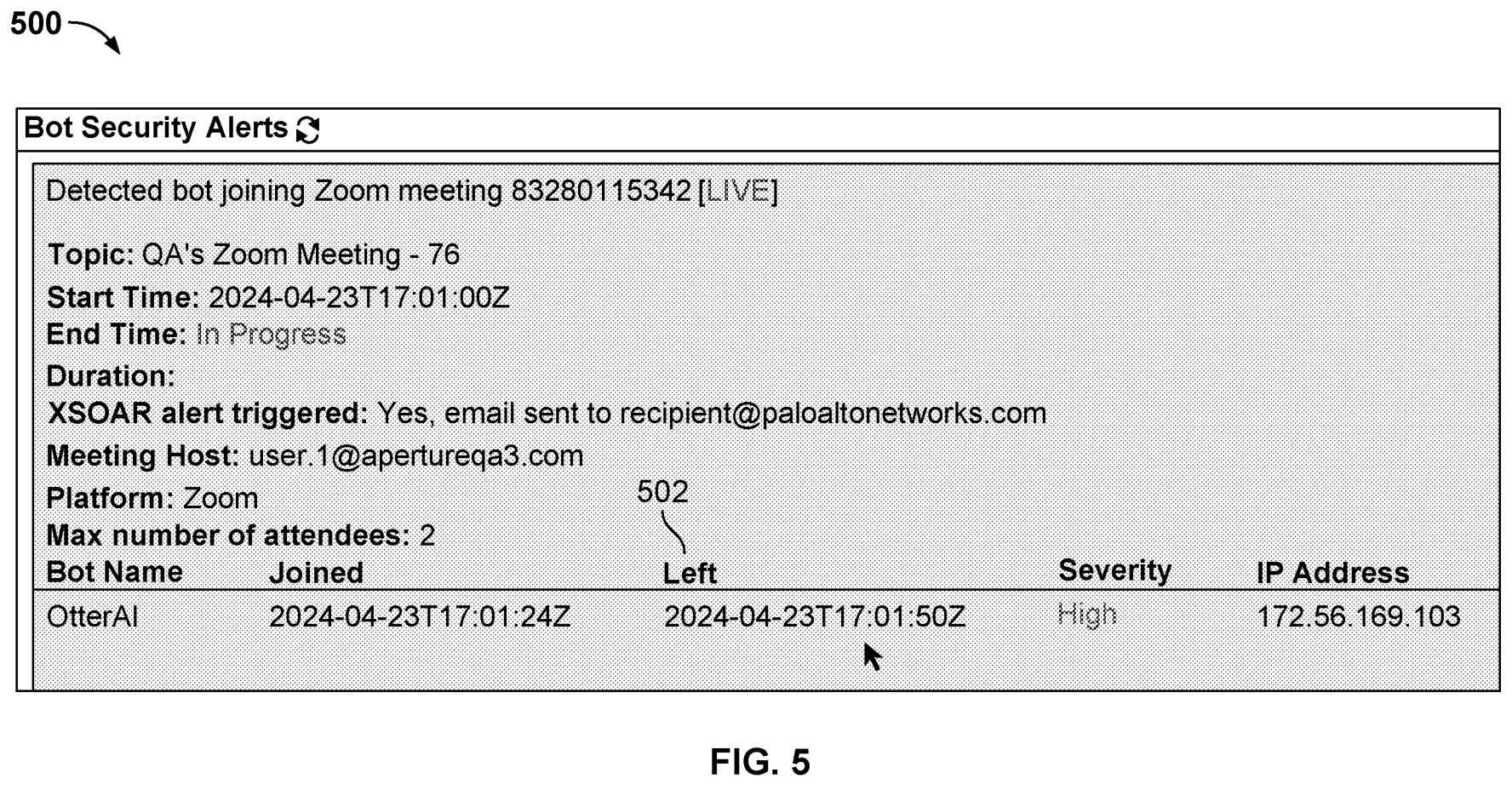

500

Bot Security Alerts

Detected bot joining Zoom meeting 83280115342 [LIVE]

Topic: QA's Zoom Meeting - 76
Start Time: 2024-04-23T17:01:00Z
End Time: In Progress
Duration:
XSOAR alert triggered: Yes, email sent to recipient@paloaltonetworks.com
Meeting Host: user.1@apertureqa3.com
Platform: Zoom
Max number of attendees: 2

502

| Bot Name | Joined | Left | Severity | IP Address |
| --- | --- | --- | --- | --- |
| OtterAI | 2024-04-23T17:01:24Z | 2024-04-23T17:01:50Z | High | 172.56.169.103 |

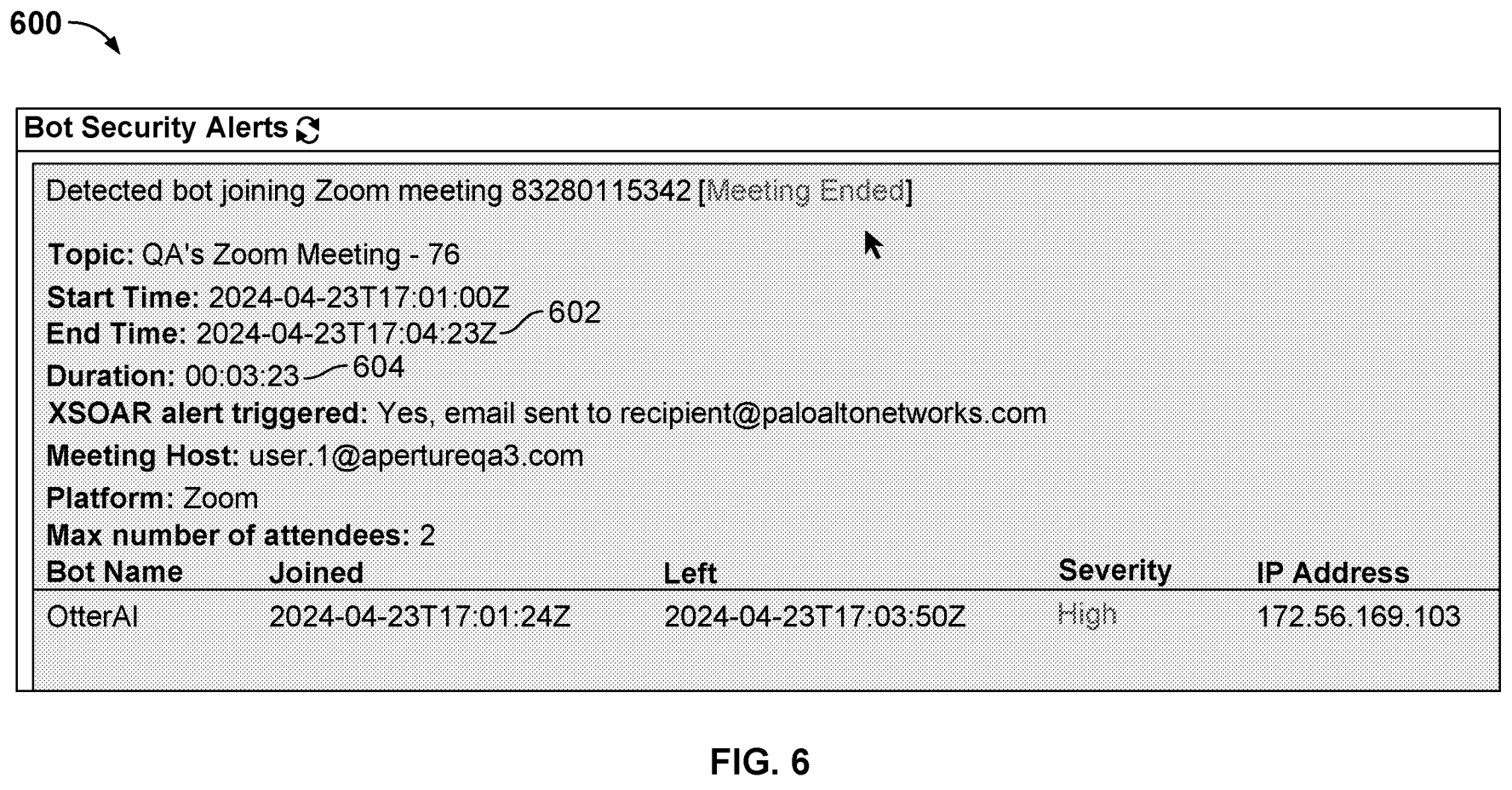

Bot Security Alerts

Detected bot joining Zoom meeting 83280115342 [Meeting Ended]

Topic: QA's Zoom Meeting - 76
Start Time: 2024-04-23T17:01:00Z
End Time: 2024-04-23T17:04:23Z 602
Duration: 00:03:23 604
XSOAR alert triggered: Yes, email sent to recipient@paloaltonetworks.com
Meeting Host: user.1@apertureqa3.com
Platform: Zoom
Max number of attendees: 2

| Bot Name | Joined | Left | Severity | IP Address |
|---|---|---|---|---|
| OtterAI | 2024-04-23T17:01:24Z | 2024-04-23T17:03:50Z | High | 172.56.169.103 |

FIG. 6

ARTIFICIAL BOT DETECTION FOR CONFERENCING APPS

BACKGROUND OF THE INVENTION

Remote workers routinely use web conferences, such as an online meeting, web seminar, and webinar platforms, to conduct their jobs. The web conference platform providers are offering productivity features, such as automated meeting transcript/summary generation. Third-party vendors are generating collaboration tools that integrate into the web conference platforms, such that a bot can join any web conference. Although many remote workers are using these bots for harmless purposes, such as note-taking, the ability for a bot to join any web conference expands the attack surface for a bad actor to obtain sensitive company information.

BRIEF DESCRIPTION OF THE DRAWINGS

Various embodiments of the invention are disclosed in the following detailed description and the accompanying drawings.

FIG. 5 is an example of an updated security alert in accordance with some embodiments.

FIG. 6 is an example of an updated security alert in accordance with some embodiments.

DETAILED DESCRIPTION

Figure 1:
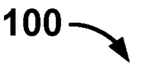
FIG. 1 is a block diagram illustrating an embodiment of a system to detect undesired attendees in accordance with some embodiments.
Figure 1:
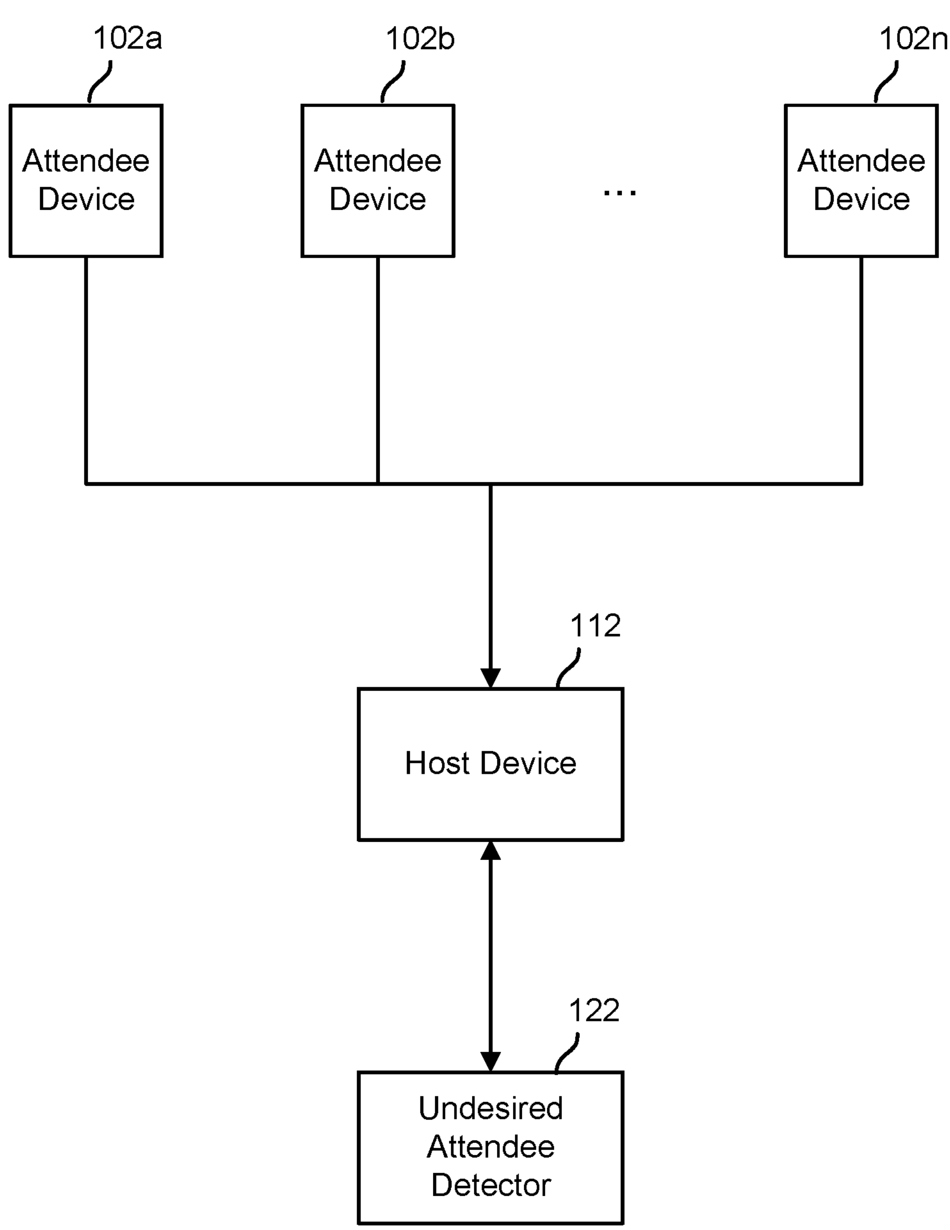

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term ‘processor’ refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A web conference (e.g., online meeting, seminar, or webinar) may be attended by hundreds, even thousands of participants. It is a painstaking process to manually determine, in real-time, whether an attendee is an actual person or an artificial intelligence (AI) bot. A bad actor may “listen in” on the web conference and use that data for model training, exfiltration, and/or other wrong activities. Furthermore, information security teams have no visibility or control over this type of behavior.

Techniques to detect undesired attendees of a web conference are disclosed herein. In some embodiments, an undesired attendee is an artificial intelligence (AI) bot. In some embodiments, an undesired attendee is an unauthorized attendee of the web conference. For example, someone may obtain the login credentials to attend the web conference, but not have been invited to web conference.

The technique includes receiving an indication to monitor a web conference. A user of a web conference platform installs software that enables the web conference to be monitored. Upon launch, the software provides to one or more servers an indication to monitor the web conference. The one or more servers may be located in a datacenter, in a cloud environment, on-prem, etc.

The technique further includes monitoring one or more of attendees joining the web conference. In some embodiments, the web conference is monitored using one or more web hooks. In some embodiments, the web conference is monitored using one or more application programming interfaces (APIs). In some embodiments, the web conference is monitored using a combination of one or more web hooks and one or more APIs.

The technique further includes determining that one or more of the one or more attendees is an undesired attendee. Each of the one or more attendees is associated with a corresponding set of attributes. The corresponding set of attributes associated with an attendee may be identified using a heuristic model. The corresponding set of attributes associated with an attendee may include an attendee internet protocol (IP) address and associated details, a calling identifier or callback number if joining from a phone, attendee name, attendee profile image, attendee identity (e.g., external or internal from company, level of authentication, etc.), and/or metadata (user-agent, SDK used, device information such as id, serial number, MAC address, disk id, imei, etc.). In some embodiments, each attribute of the corresponding set of attributes is evenly weighted. In some embodiments, at least one attribute in the corresponding set of attributes has a different weight than the other attributes in the corresponding set of attributes. For example, a reverse lookup is performed on the IP address associated with the attendee. Certain IP addresses are associated with a cloud service, such as AWS. An attendee having an IP address associated with the cloud service weighs in favor of the attendee being a bot.

One or more models analyze the corresponding set of attributes associated with an attendee to determine whether the attendee is an undesired attendee. An embedding vector comprised of values associated with the corresponding set of attributes is provided as input to the one or more models.

The one or more models are configured to output a score indicating whether the attendee is an undesired attendee (e.g., a bot, uninvited attendee, etc.) or a legitimate attendee. The one or more models may be a machine learning model, a heuristic model, a different type of mathematical model, and/or a combination thereof. The machine learning model may be trained using supervised learning, unsupervised learning, semi-supervised learning, and/or reinforcement learning. In some embodiments, the machine learning model is trained using a k-means clustering technique. The embedding vector places the attendee in an embedding space. The attendee may be determined to be an undesired attendee or a legitimate attendee based on a distance of the embedding vector to a undesired attendee cluster or a legitimate attendee cluster. An attendee may be determined to be an undesired attendee if the distance between their embedding vector and the undesired attendee is less than a threshold distance. The embedding space continues to grow as more and more web conferences are monitored. Each attendee is placed in the embedding space based on their embedding vector. This reduces the number of false positives because the undesired attendee and the legitimate attendee clusters become more distinct in the embedding space as more attendees are added.

One or more behavioral models may be implemented to determine that one or more of the one or more attendees is an undesired attendee. The one or more behavioral models are constructed using a baseline of normal user activity. The baseline of normal user activity may be specific to a particular attendee, that is, what is normal for a first attendee may be different for a second attendee. Behavioral attributes used to determine whether one or more of the one or more attendees is an undesired attendee include whether the attendee joined the web conference at the meeting start time with second precision, whether the attendee is participating in multiple meetings at the same time (a bot is able to join multiple meetings at the same time using a VM whereas a user device will normally crash), whether the attendee has a history of being silent in a web conference (e.g., no video, no chat, no reactions), etc. Other characteristics, such as IP address, device used, profile image, looks (if camera is used), and/or normal hours of operations may be used by the one or more behavioral models to determine that one or more of the plurality of attendees is an undesired attendee.

The technique further includes performing an action in response to determining that one or more of the one or more attendees is an undesired attendee. In some embodiments, the undesired attendee is removed from the web conference. In some embodiments, an owner associated with the web conference is notified about the presence of the undesired attendee. In some embodiments, the other attendees of the web conference are notified about the presence of the undesired attendee (e.g., via a chat feature). In some embodiments, the web conference is terminated. In some embodiments, a security alert is created for a security operations center (SOC).

FIG. 1 is a block diagram illustrating an embodiment of a system to detect undesired attendees in accordance with some embodiments. In the example shown, system 100 includes a host device 112 that is configured to host one or more web conferences via web conferencing software. Host device 112 may be a server, a computer, a desktop, a laptop, a tablet, a smartphone or any other device capable using web conferencing software to host a web conference.

A plurality of attendees may join a web conference via attendee devices 102*a*, 102*b*, . . . , 102*n*. Although FIG. 1 depicts three devices joining a web conference, 1:n devices may join the web conference. Attendee devices 102*a*, 102*b*, . . . , 102*n* may be a computer, a desktop, a laptop, a tablet, a smartphone, a virtual machine, a container, a phone, a cell phone, a smartwatch, or any other device having the capability to join a web conference.

Host device 112 has installed software that enables a web conference to be monitored. Upon launching the software, host device 112 provides to undesired attendee detector 122 an indication to monitor the web conference. Undesired attendee detector 122 is running on one or more servers, one or more computers, one or more virtual machines, or one or more containers. Undesired attendee detector 122 may be located remote from host device 112, such as in a remote data center or in a cloud environment. In some embodiments, undesired attendee detector 122 is located on-prem near host device 112. In some embodiments, undesired attendee detector is running on host device 112.

In response to receiving the indication from host device 112, undesired attendee detector 122 is configured to monitor the web conference. In some embodiments, the web conference is monitored using one or more web hooks. In some embodiments, the web conference is monitored using one or more APIs. In some embodiments, the web conference is monitored using a combination of one or more web hooks and one or more APIs.

Undesired attendee detector 122 determines a corresponding set of attributes associated with an attendee as soon as the attendee joins the web conference. The corresponding set of attributes associated with an attendee may be identified using a heuristic model. The corresponding set of attributes may include an attendee internet protocol (IP) address and associated details, a calling identifier or callback number if joining from a phone, attendee name, attendee profile image, attendee identity (e.g., external or internal from company, level of authentication, etc.), and/or metadata (user-agent, SDK used, device information such as id, serial number, MAC address, disk id, imei, etc.). Each attribute in the corresponding set of attributes is assigned a corresponding weight. In some embodiments, each attribute of the corresponding set of attributes is evenly weighted. In some embodiments, at least one attribute in the corresponding set of attributes has a different weight than the other attributes in the corresponding set of attributes.

Undesired attendee detector 122 includes one or more models configured to determine whether an attendee associated with a web conference is an undesired attendee based on values of attributes included in the corresponding set of attributes. An embedding vector comprised of values associated with the corresponding set of attributes is provided as input to the one or more models. The one or more models are configured to output a score indicating whether the attendee is an undesired attendee (e.g., a bot, uninvited attendee, etc.) or a legitimate attendee. The one or more models may be a machine learning model, a heuristic model, a different type of mathematical model, and/or a combination thereof. The machine learning model may be trained using supervised learning, unsupervised learning, semi-supervised learning, and/or reinforcement learning. In some embodiments, the machine learning model is trained using a k-means clustering technique. The embedding vector places the attendee in an embedding space. The attendee may be determined to be an undesired attendee or a legitimate attendee based on a distance of the embedding vector to a undesired attendee cluster or a legitimate attendee cluster. An attendee may be determined to be an undesired attendee if the distance between their embedding vector and the undesired attendee is less than a threshold distance. The embedding space continues to grow as more and more web conferences are monitored. Each attendee is placed in the embedding space based on their embedding vector. This reduces the number of false positives because the undesired attendee and the legitimate attendee clusters become more distinct in the embedding space as more attendees are added.

The one or more models may include one or more behavioral models trained to detect abnormal behavior associated with an attendee. The one or more behavioral models are configured to compare current behavior associated with an attendee to a baseline normal behavior associated with the attendee. In some embodiments, the one or more behavioral models are configured to compare current behavior associated with an attendee to a baseline normal behavior associated with a generic attendee.

Undesired attendee detector 122 is configured to determine behavioral attributes associated with an attendee, such as whether the attendee joined the web conference at the meeting start time with second precision, whether the attendee is participating in multiple meetings at the same time, whether the attendee has a history of being silent in a web conference (e.g., no video, no chat, no reactions), etc. The one or more behavioral models are configured to compare the behavioral attributes associated with the attendee to the baseline normal behavior associated with the attendee. In some embodiments, the one or more behavioral models are configured to compare the behavioral attributes associated with the attendee to the baseline normal behavior associated with a generic attendee.

In response to determining that one or more of the plurality of attendees is an undesired attendee, undesired attendee detector 122 is configured to perform one or more actions. In some embodiments, undesired attendee detector 122 provides to host device 122, via an API, a command to remove the undesired attendee from the web conference. In some embodiments, undesired attendee detector 122 provides to host device 122, via an API, a notification that indicates a presence of one or more undesired attendees. In some embodiments, host device 122 notifies the plurality of attendee devices 102*a*, 102*b*, . . . , 102*n* in response to receiving the notification. For example, the notification may appear in a chat message or a pop-up window in the web conference. In some embodiments, undesired attendee detector 122 provides to host device 122, via an API, a command to terminate the web conference. In response to receiving the command, host device 122 is configured to terminate the web conference. In some embodiments, undesired attendee detector 122 is configured to generate a security alert for a security operations center.

Figure 2:
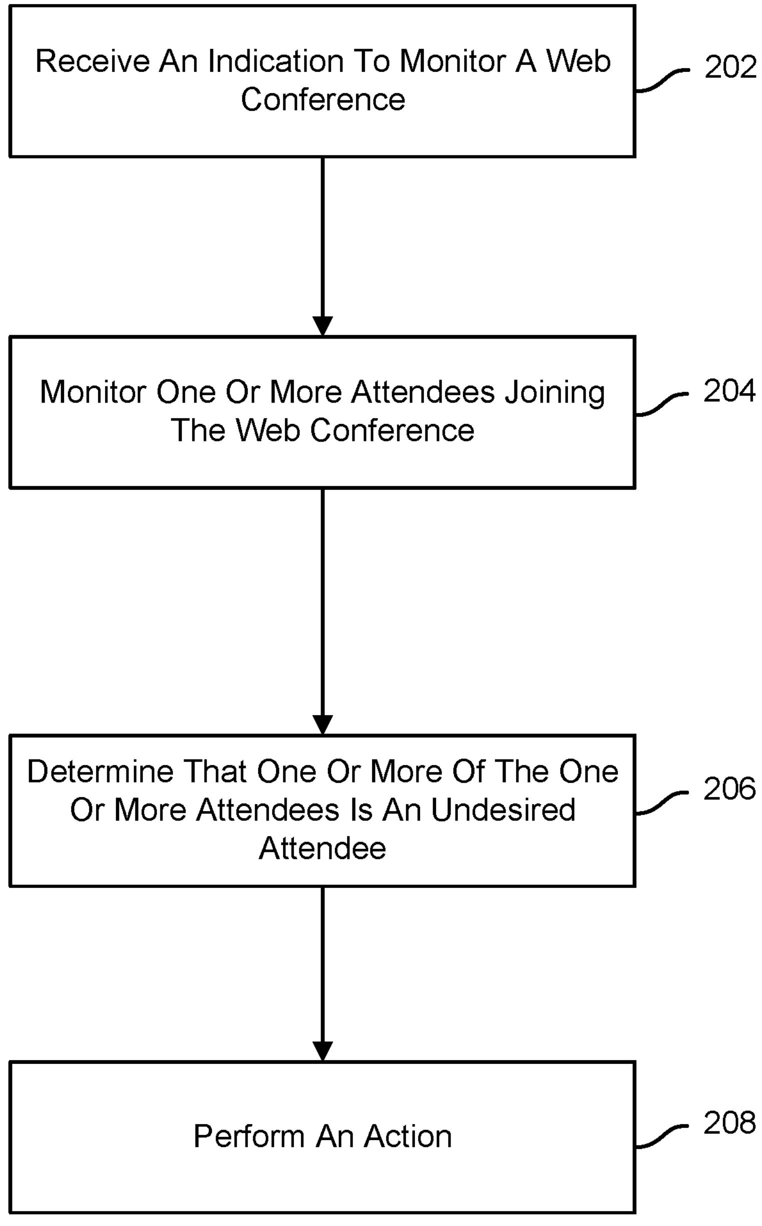
FIG. 2 is a flow diagram illustrating an embodiment of a process to detect undesired attendees in accordance with some embodiments.

FIG. 2 is a flow diagram illustrating an embodiment of a process to detect undesired attendees in accordance with some embodiments. In the example shown, process 200 may be implemented by an undesired attendee detector, such as undesired attendee detector 122.

At 202, an indication to monitor a web conference is received. A user of a web conference platform installs software that enables the web conference to be monitored. Upon launch, the software provides to one or more servers an indication to monitor the web conference. The one or more servers may be located in a datacenter, in a cloud environment, on-prem, etc.

At 202, one or more attendees joining the web conference are monitored. In some embodiments, the web conference is monitored using one or more web hooks. In some embodiments, the web conference is monitored using one or more application programming interfaces (APIs). In some embodiments, the web conference is monitored using a combination of one or more web hooks and one or more APIs.

At 204, it is determined that one or more of the one or more attendees is an undesired attendee. Each attendee is associated with a corresponding set of attributes. The corresponding set of attributes associated with an attendee may be identified using a heuristic model. The corresponding set of attributes may include an attendee internet protocol (IP) address and associated details, a calling identifier or callback number if joining from a phone, attendee name, attendee profile image, attendee identity (e.g., external or internal from company, level of authentication, etc.), and/or metadata (user-agent, SDK used, device information such as id, serial number, MAC address, disk id, imei, etc.). In some embodiments, each attribute of the corresponding set of attributes is evenly weighted. In some embodiments, at least one attribute in the corresponding set of attributes has a different weight than the other attributes in the corresponding set of attributes.

One or more models analyze the corresponding set of attributes associated with an attendee to determine whether the attendee is an undesired attendee. The one or more models may also utilize known IP addresses associated with bots in its determination. An embedding vector comprised of values associated with the corresponding set of attributes is provided as input to the one or more models. The one or more models are configured to output a score indicating whether the attendee is an undesired attendee (e.g., a bot, uninvited attendee, etc.) or a legitimate attendee. The one or more models may be a machine learning model, a heuristic model, a different type of mathematical model, and/or a combination thereof. The machine learning model may be trained using supervised learning, unsupervised learning, semi-supervised learning, and/or reinforcement learning. In some embodiments, the machine learning model is trained using a k-means clustering technique. The embedding vector places the attendee in an embedding space. The attendee may be determined to be an undesired attendee or a legitimate attendee based on a distance of the embedding vector to a undesired attendee cluster or a legitimate attendee cluster. An attendee may be determined to be an undesired attendee if the distance between their embedding vector and the undesired attendee is less than a threshold distance.

One or more behavioral models may be implemented to determine that one or more of the one or more attendees is an undesired attendee. The one or more behavioral models are constructed using a baseline of normal user activity. The baseline of normal user activity may be specific to a particular attendee, that is, what is normal for a first attendee may be different for a second attendee. Behavioral attributes used to determine whether one or more of the plurality of attendees is an undesired attendee include whether the attendee joined the web conference at the meeting start time with second precision, whether the attendee is participating in multiple meetings at the same time, whether the attendee has a history of being silent in web conferences (e.g., no video, no chat, no reactions), etc. Other characteristics, such as IP address, device used, profile image, looks (if camera is used), and/or normal hours of operations may be used by the one or more behavioral models to determine that one or more of the one or more attendees is an undesired attendee.

At 206, an action is performed. In some embodiments, the undesired attendee is removed from the web conference. In some embodiments, an owner associated with the web conference is notified about the presence of the undesired attendee. In some embodiments, the other attendees of the web conference are notified about the presence of the undesired attendee (e.g., via a chat feature). In some embodiments, the web conference is terminated. In some embodiments, a security alert is created for a SOC.

Figure 3:
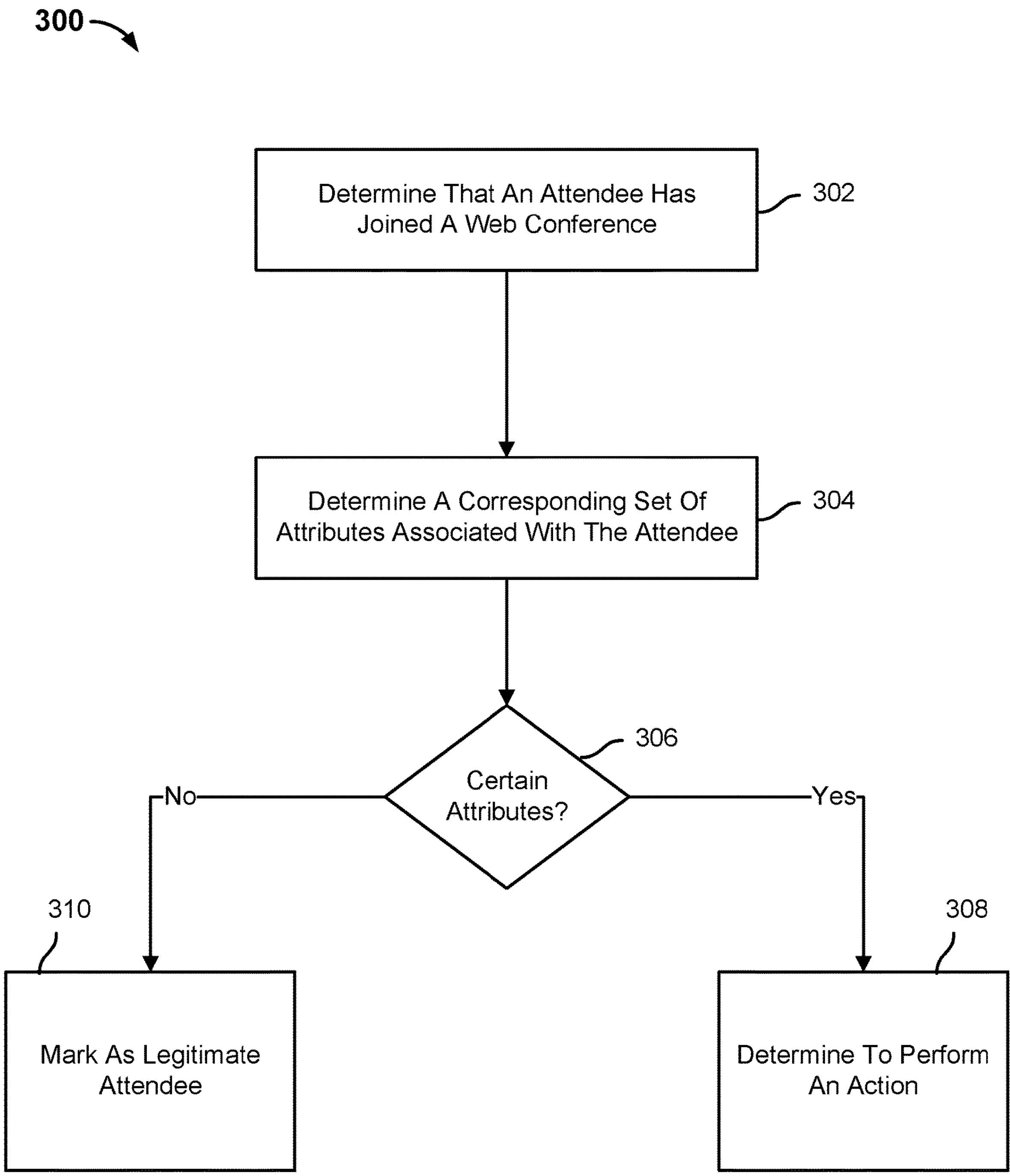
FIG. 3 is a flow diagram illustrating a process of determining whether an attendee is an undesired attendee in accordance with some embodiments.

FIG. 3 is a flow diagram illustrating a process of determining whether an attendee is an undesired attendee in accordance with some embodiments. In the example shown, process 300 may be implemented by an undesired attendee detector, such as undesired detector 122. In some embodiments, process 300 is implemented to perform some or all of step 206 of process 200.

At 302, it is determined that an attendee has joined a web conference.

At 304, a corresponding set of attributes associated with the attendee is determined.

At 306, it is determined whether one or more values associated with one or more certain attributes indicate that the attendee is an undesired attendee. In response to a determination that one or more values associated with one or more certain attributes indicate that the attendee is an undesired attendee, process 300 proceeds to 308. In response to a determination that one or more values associated with one or more certain attributes indicate that the attendee is not an undesired attendee (e.g., desired attendee), process 300 proceeds to 310.

At 308, it is determined to perform an action.

At 310, the attendee is marked as a legitimate attendee.

Figure 4:
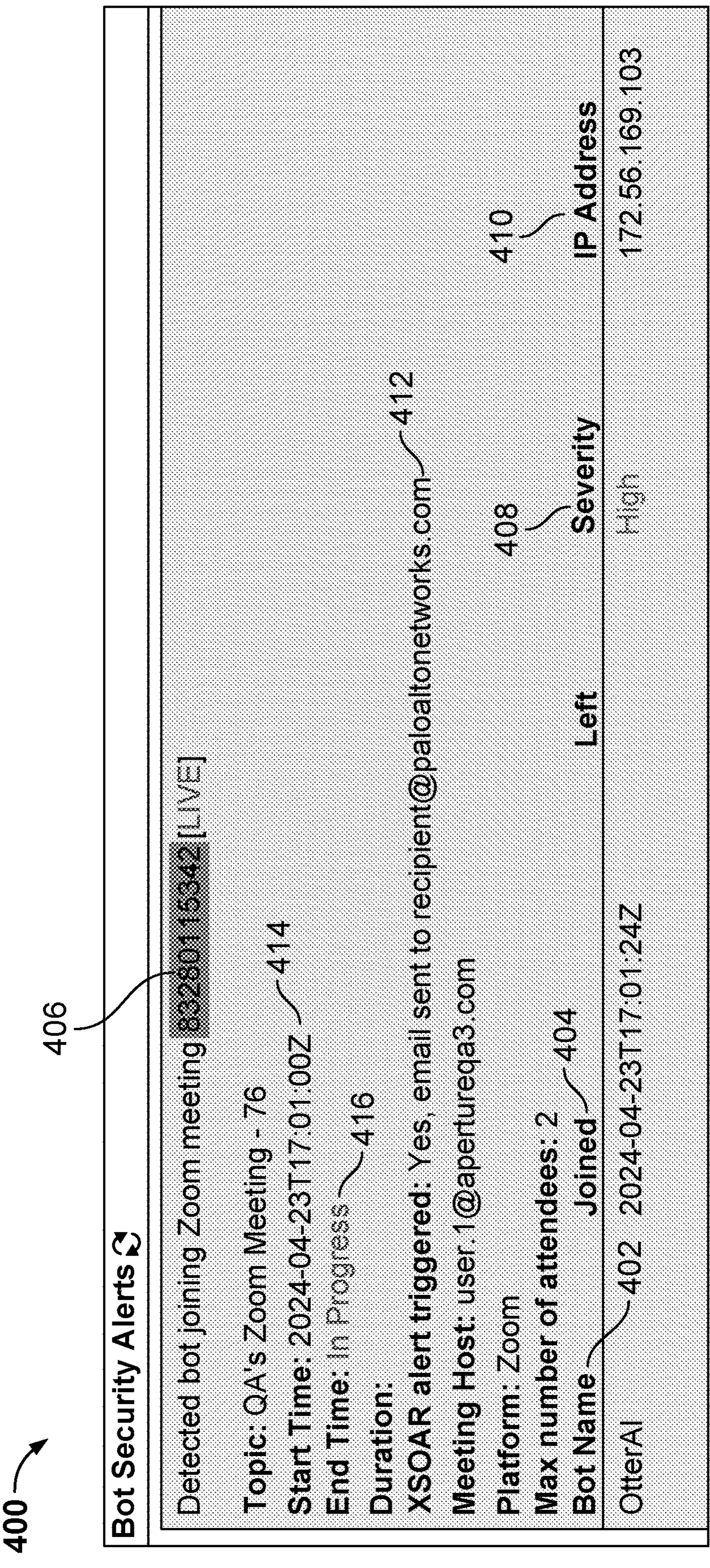
FIG. 4 is an example of a security alert generated in accordance with some embodiments.

FIG. 4 is an example of a security alert generated in accordance with some embodiments. In the example shown, security alert 400 may be generated by an undesired attendee detector 122. In some embodiments, security alert 400 is generated at step 208 of process 200.

Security alert 400 is provided in response to detecting an undesired attendee 402. Security alert 400 may indicate when undesired attendee 402 joined 404 meeting 406. Security alert 400 may indicate a severity 408 associated with undesired attendee attending meeting 406. Security alert 400 may indicate an IP address 410 associated with undesired attendee.

Security alert 400 may indicate a recipient 412 of security 400. Security alert 400 indicates a start time 414 associated with online meeting 406 and an end time 416 associated with online meeting 406.

FIG. 5 is an example of an updated security alert in accordance with some embodiments. In the example shown, updated security alert 500 may be updated by an undesired attendee detector 122. In some embodiments, security alert 400 is updated at step 208 of process 200 to become updated security alert 500. In the example shown, security alert 400 has been updated to indicate a time 502 at which undesired attendee has left meeting 406.

FIG. 6 is an example of an updated security alert in accordance with some embodiments. In the example shown, security alert 600 may be updated by an undesired attendee detector 122. In some embodiments, security alert 500 is updated at step 208 of process 200 to become updated security alert 500. Security alert 500 has been updated to indicate an end time 602 associated with meeting 406 and a duration 604 associated with meeting 406.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a communication interface; and a processor coupled to the communication interface and configured to:

monitor one or more attendees joining a web conference, wherein the web conference is monitored using one or more web hooks;

generate embedding vectors in an embedding space using an identified set of attributes corresponding to each of the one or more attendees, wherein the identified set of attributes are generated using the one or more web hooks, and wherein the embedding space includes embeddings associated with a plurality of attendees attending a plurality of web conferences;

utilize, by a machine learning model, the embedding vectors to determine that a first attendee of the one or more attendees is an undesired attendee by determining that a corresponding embedding vector associated with the first attendee is less than a threshold distance to an undesired attendee cluster of the embedding space; and in response to the determination by the machine learning model that the first attendee of the one or more attendees is the undesired attendee, provide to a host device an application programming interface (API) command to remove the first attendee.

2. The system of claim 1, wherein the communication interface is configured to receive an indication to monitor the web conference.

3. The system of claim 1, wherein the one or more attendees join the web conference using a corresponding device.

4. The system of claim 3, wherein the corresponding device is a computer, a tablet, a smartphone, a virtual machine, a container, a phone, a cell phone, or a smart device.

5. The system of claim 1, wherein the one or more attendees are monitored using the one or more web hooks.

6. The system of claim 1, wherein the one or more attendees are monitored using one or more application program interfaces (APIs).

7. The system of claim 1, wherein the identified set of corresponding attributes includes an attendee internet protocol (IP) address and associated details, a calling identifier or callback number if joining from a phone, attendee name, attendee profile image, attendee identity, and/or metadata.

8. The system of claim 7, wherein each attribute in the identified set of corresponding attributes is given an equal weight.

9. The system of claim 7, wherein at least one attribute in the corresponding set of attributes is given a weight that is different from other attributes included in the corresponding set of attributes.

10. The system of claim 1, wherein to determine that the one or more of the one or more attendees is the undesired attendee, the processor is configured to provide values associated with the identified set of corresponding attributes to one or more models.

11. The system of claim 10, wherein the one or more models include one or more machine learning models, one or more heuristic models, one or more statistical models, and/or one or more other mathematical models.

12. The system of claim 10, wherein the one or more models include one or more behavioral models configured to determine one or more behavioral attributes associated with the one or more attendees.

13. The system of claim 12, wherein the one or more behavioral attributes include whether the one or more attendees joined the web conference at a start time with second precision, whether the one or more attendees are participating in multiple meetings at a same time, and/or whether the one or more attendees have history of being silent in web conferences.

14. The system of claim 1, wherein in response to the determination by the machine learning model that the first attendee of the one or more attendees is the undesired attendee, the processor is further configured to provide a command to remove the undesired attendee from the web conference, provide a notification of a presence of the undesired attendee, notify the one or more attendees of the presence of the undesired attendee, cause the web conference to be terminated, and/or generate a security alert.

15. A method, comprising:

monitoring one or more attendees joining a web conference, wherein the web conference is monitored using one or more web hooks;

generating embedding vectors in an embedding space using an identified set of attributes corresponding to each of the one or more attendees, wherein the identified set of attributes are generated using the one or more web hooks, and wherein the embedding space includes embeddings associated with a plurality of attendees attending a plurality of web conferences;

utilizing, by a machine learning model, the embedding vectors to determine that a first attendee of the one or more attendees is an undesired attendee by determining that a corresponding embedding vector associated with the first attendee is less than a threshold distance to an undesired attendee cluster of the embedding space; and in response to the determination by the machine learning model that the first attendee of the one or more attendees is the undesired attendee, providing to a host device an application programming interface (API) command to remove the first attendee.

16. The method of claim 15, further comprising receiving an indication to monitor the web conference.

17. The method of claim 15, wherein the one or more attendees are monitored using the one or more web hooks and/or one or more APIs.

18. The method of claim 15, wherein in response to the determination by the machine learning model that the first attendee of the one or more attendees is the undesired attendee, the method further comprsises: providing a command to remove the undesired attendee from the web conference, providing a notification of a presence of the undesired attendee, notifying the one or more attendees of the presence of the undesired attendee, causing the web conference to be terminated, and/or generating a security alert.

19. A computer program product embodied in a non-transitory computer readable medium and comprising computer instructions for:

monitoring one or more attendees joining a web conference, wherein the web conference is monitored using one or more web hooks;

generating embedding vectors in an embedding space using an identified set of attributes corresponding to each of the one or more attendees, wherein the identified set of attributes are generated using the one or more web hooks, and wherein the embedding space includes embeddings associated with a plurality of attendees attending a plurality of web conferences;

utilizing, by a machine learning model, the embedding vectors to determine that a first attendee of the one or more attendees is an undesired attendee by determining that a corresponding embedding vector associated with the first attendee is less than a threshold distance to an undesired attendee cluster of the embedding space; and in response to the determination by the machine learning model that the first attendee of the one or more attendees is the undesired attendee, providing to a host device an application programming interface (API) command to remove the first attendee.

* * * * *